United States Patent [19]

Kiss

[11] Patent Number: 4,521,477

[45] Date of Patent: Jun. 4, 1985

[54] MULTILAYER FIBRE MAT AND PROCESS FOR ITS PRODUCTION

[76] Inventor: Günter H. Kiss, Gustav-Freytag-Strasse 7, D-1000 Berlin 33, Fed. Rep. of Germany

[21] Appl. No.: 426,900

[22] Filed: Sep. 29, 1982

[30] Foreign Application Priority Data

Oct. 2, 1981 [DE] Fed. Rep. of Germany ....... 3139854
Sep. 6, 1982 [DE] Fed. Rep. of Germany ....... 3233385

[51] Int. Cl.[3] ......................... B29J 5/04; B32B 31/12; B32B 31/20; D04H 1/58

[52] U.S. Cl. .................................... 428/282; 156/62.2; 156/62.8; 264/113; 264/331.18; 264/331.22; 428/284; 428/286; 428/331.11

[58] Field of Search ....................... 428/282, 284, 286; 19/302; 156/177, 178, 179, 62.2, 62.8; 264/113, 333.11, 331.18, 331.22

[56] References Cited

U.S. PATENT DOCUMENTS 3,645,814 2/1972 Knoepfler et al. .................... 19/302
3,952,124 4/1976 Mesek ................................ 428/284
3,963,392 6/1976 Goyal .................................. 19/302
3,978,257 8/1976 Ring .................................. 428/286
4,081,582 3/1978 Butterworth et al. .............. 428/284
4,082,886 4/1978 Butterworth et al. .............. 428/286
4,142,016 2/1979 Perry ................................. 428/286
4,198,460 4/1980 Kiss .................................. 428/284
4,310,585 1/1982 Shannon ............................. 428/286
4,331,730 5/1982 Sorenson ............................ 428/286
4,377,615 3/1983 Suzuki et al. ...................... 428/286

*Primary Examiner*—James C. Cannon
*Attorney, Agent, or Firm*—Lee C. Robinson, Jr.

[57] ABSTRACT

A specially constructed multilayer fibre mat is made up of two cover layers of fibres with a high-quality thermosetting plastics impregnation and a central layer of if necessary short-fibre wood products with more particularly cheap thermoplastic bonding agent additives. In that construction and that composition the mats offer special possible applications for mouldings in the motor car industry, both as regards their manufacturing process and also the quality of the end product itself.

17 Claims, 3 Drawing Figures

Fig.1
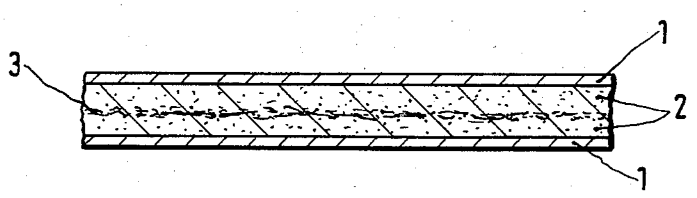
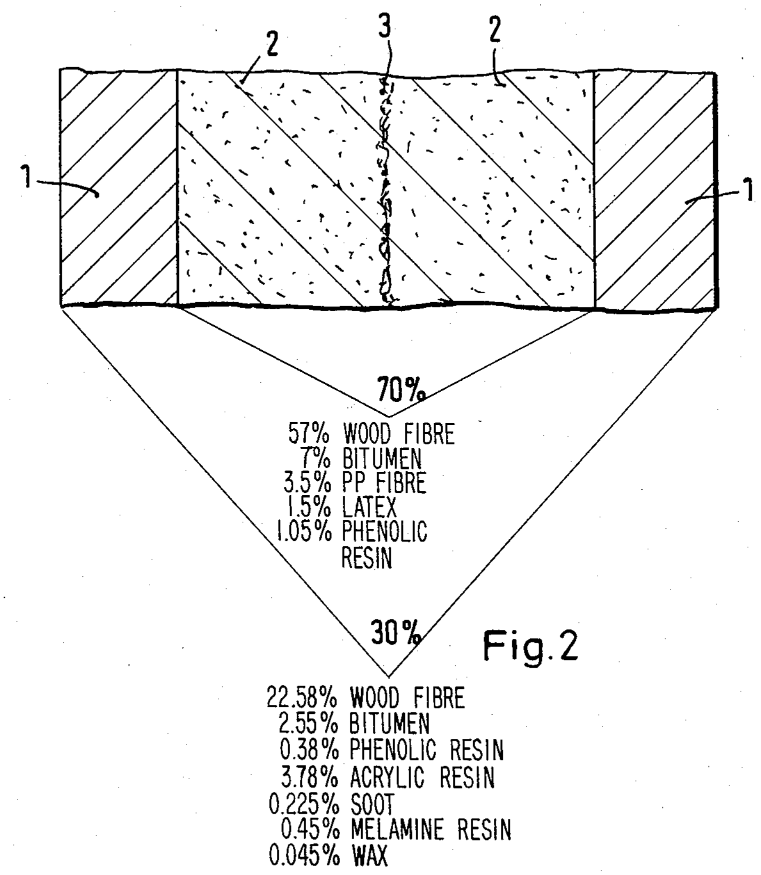
Fig.2

MULTILAYER FIBRE MAT AND PROCESS FOR ITS PRODUCTION

The invention relates to a multilayer fibre mat for the production of mouldings in a die such as are used, for example, for the inside linings of private cars in the motor car industry; the invention also relates to a process for the production of such mats.

Tangled fibre fleece mats with various bonding agent additives and concentrations are of course used as single or multilayer mats for various purposes. For example, it has for many years been usual in the sanitary industry to use multilayer fleece material products in which the outer layers are composed of relatively long and relatively high-quality fibres, while the central layer consists of short-fibre celluloses or similar materials of inferior quality. Known thermal and other insulating mats of glass fibres, asbestos fibres, or mixtures thereof are similar layered structures of staged fibre quality. It is also conventional, more particularly in the furniture industry, to make chipboards, for instance for the manufacture of kitchen furniture, by arranging wood chips in layers with additives of thermoplastic and thermosetting resins.

However, the problems, demands and aims of these branches of industry, mentioned merely by way of example, are of a very different nature and call for very different solutions, which are seldom even partially comparable to one another.

Assuming that the cheapest possible starting materials are used, the main difficulties when deforming flat tangled fibre fleece mats of cellulose or lignose lie in conducting deforming operations without thinning-out or tearing of the loose fibre structure.

To overcome these difficulties it is known to act on wood fibres of adequate fibre length with mixtures of thermosetting and thermoplastic bonding agents, thus vapour-treating the fibres for the deforming process—i.e., making them so pliable that even complicated mouldings of perfect quality can be produced by step-by-step deformation.

Any attempt to use as cheap thermoplastic bonding agents as possible, which are non-resistant to oxidation, particularly under the influence of heat, presents difficulties, since economically unacceptable limits are placed on the generally desired feature of carrying out the pressing operation in brief cycles. Brief cycles, with the resulting high temperature stressing of the workpiece, cannot therefore be performed in the case of cheap thermoplastic bonding agent additives; the same thing applies equally to the use of low-priced short fibre material, the reject-free processing of which has hitherto been possible only at the cost of an increase in the addition of bonding agents, more particularly thermoplastic bonding agents.

This is the point at which the invention starts; the problem to which it relates is so to adjust the composition of fibre mats that it becomes possible to use large proportions of cheap bonding agents and fibrous materials for the stated purpose of producing high-quality finished mouldings, more particularly for the motor car industry. Another problem to which the invention relates is to provide a suitable process for the production of such fibre mats.

According to an aspect of this invention, a multilayer fibre mat is provided, the mat being suited for the production of mouldings in a die process, in which pressure is applied to the fibre mat while temperature is maintained in a range of 170° to 210° C. The mat is constructed of cellulose, lignose, or other woody fibres in two outer cover layers whose fibrous content comprises 10 to 30% of the total fibrous material. These cover layers also contain a proportion of thermosetting resins which can be pressed in a temperature range of 170° to 210° C. A central layer is sandwiched between the cover layers and contains a thermosetting bonding agent additive which, in the absence of the cover layers, would have an inadequate resistance to oxidation in the above temperature range. Consequently, the fibre mat of this inventive construction permits superior results, even if inexpensive bitumen is used as the binder material for the central layer. With the mat of this invention there is less objectionable odour than formerly, and the moulded mat has superior resistance to water absorption and expansion.

Advantageous embodiments of this solution to the problems can be gathered from various processes according to this invention, more particularly also as regards specially suited forms of the process. Although the problem stated has existed for years, no suggestions have yet been made for the use of cheap bonding agents such as, for example, bitumen, even in relatively large quantities of short fibre mat material which even suggests a multilayer fibre mat composition. On the contrary, the methods adopted by engineers in the art in the past was either to increase the proportion of relatively expensive thermosetting plastics or to improve the processing of fibre mats with somewhat lower proportions of thermosetting resins by adding supporting layers of high-quality fabric.

The use of a multilayer fibre mat constituted and produced according to the invention, with fibrous cover layers having if necessary a proportion of relatively long fibres, and a proportion of thermosetting bonding agents which is adequate in relation to the cover layers but very small in relation to the total fibrous material, an intermediate layer of mainly cheap short wood fibres being used, to which cheap bitumen is added, therefore has the advantage that relatively large quantities of cheap bonding agent additives can be used. This also reduces water absorption and improves the deformability of the multilayer fibre mats. Another advantage is the elimination of the troublesome smell, otherwise caused by the addition of cheap bitumen fractions, by completely covering the central layer by the cover layers, which as a result of the additional proportion of thermosetting plastics enclose the bitumen and thermoplastic bonding agents. The multilayer construction also ensures increased deformability and the visual and mechanical improvement of the moulded product.

The high-quality thermosetting plastics in the cover fleece layers, which are added in only small quantities in relation to the total mass of the fibre mat, considerably increases surface quality and creates completely novel possibilities for any desired surface structuring of the moulding.

Further important advantages of the use of the multilayer fibre mat constructed as described for the purpose mentioned are obtained during the operation of deforming the fibre mat i.e., when it is pressed into mouldings, for the following reasons: the thermoplastic bonding agents mentioned, such as bitumen, can be heated only to a very limited extent during the pressing operation, since otherwise they oxidize so strongly that they lose their bonding agent properties. However, higher pressing temperatures are unavoidable in production with the required increased output rates—i.e., shortened cycles—, so that as a result hitherto it was in practice prohibitive to process cheap bitumen or similar bonding agents, consequently seemed inevitable to use high-quality, relatively expensive thermosetting plastics as bonding agents.

For the stated purpose of use, the multilayer fibre mat according to the invention combines the advantages accruing both to processing and the quality of the end product from the use of thermosetting plastics on the one hand and thermoplastic bonding agents on the other, while at the same time avoiding the disadvantages. The low resistance to oxidation of the thermoplastic bonding agent, even although relatively high proportions of bonding agent are used in the central layer causes no trouble, in view of the presence of thin cover layers of fibre fleece material additionally impregnated with thermosetting synthetic resins, and therefore makes possible considerably shortened cycles of pressing, with correspondingly increased pressing temperatures. Even though the pressing cycles are considerably shortened, as against comparable known mouldings, the invention now enables finished parts of completely neutral odor to be produced whose other properties, more particularly including their attractive appearance, are also improved.

Another advantage is afforded in the production of the multilayer fibre mat described, in which the fibres are poured on to a fleece support, such as a sieve sheet, while at the same time negative pressure is applied to the underside of the fleece support. Due to the mesh width of the fleece support, hitherto considerable losses of material had to be accepted in the case of the pulverulent and very short-fibre components of the fibrous material. The feature that the central layer, containing thermoplastic additives, is completely enclosed by the cover layer, which also contains proportions of thermosetting bonding agents, prevents the risk, otherwise present, that the pressing tools will get dirty.

However, in the process according to the invention, first of all on the fleece support the fibres intended for the first cover layer, with at least a proportion of long fibres, are poured on to the sieve belt, and only then is the central layer, with preferably short-fibre components, applied, so that even large amounts of dust can be held back, since the bottom, long-fibre cover layer acts to a certain extent as a dust filter. The production of the multilayer fibre mat of the kind described is also improved as regards the possibility of colouring the fibres, introducing special additives such as, for instance, fungicides and fire-inhibiting substances, and more particularly also as regards the addition of synthetic resin fibres to the central layer. Preferably use is made more particularly of thermoplastic fibres with a softening point below 200° C. The short and/or long fibre components can be added to the central layer and cover layers respectively before they are poured on to the fleece support, for instance, the sieve conveyor belt, after the addition of the individual bonding agents and after the dividing up of the component flows with adequate mixing, but optionally even before. For all three layers of the multilayer fibre mat, it is possible to start from the uniform fibrous material before it is poured on to the fleece support and optionally to supply exclusively to the component flows for the cover layers additives which contain no thermoplastic bonding agents, or else to divide up the component flows, only after the fibrous mass has been acted upon jointly by thermoplastic bonding agents.

Embodiments will now be presented in the form of survey Tables for explaining the invention in greater detail.

The first thing which the embodiments indicate is that mouldings can be produced with technical properties which are at least equal to those of the prior art, but are improved as regards water absorption and expansion in thickness. This means that even relatively inferior bonding agents can be used in the central layer for the multilayer mats according to the invention. The cheapness of these inferior bonding agents of the central layer enables the quantity of bonding agent to be increased, the result being reduced values of water absorption and expansion of thickness. The result is improved resistance to weathering, reduced warping, and enhanced resistance to dampness.

Although this is not shown in the Tables, the mouldings in the embodiments also have smoother surfaces and therefore improved adhesion-mediating properties for glues during the subsequent lining, coating and lacquering of the mouldings.

TABLE 1

| Materials used | |
|---|---|
| Bonding agent for cover layers: | Acrylic acid ester polymer "Acronal 12 DE", made by BASF, prepared as a dispersion mixture with 40-50% proportion of resin |
| Colouring agents for cover layers: | I. Soot dispersion "Derusol Z35", made by Degussa Dispersion composition: as supplied |
| | II. "HBG Lacquer black" made by Bayer, as delivered (colour dispersion) |
| | III. "Waxoline black", made by ICI, (powder colour) |
| Bonding agent for central layer: | A. Bitumen, Type HVB 95/105, made by Shell |
| | B. Bitumen, Type R 135/10, made by Shell |
| | C. Bitumen, Type HVB 85/95, made by Shell |
| Fibrous material (cover and central layers): | Wood fibres of different screening |

TABLE 2

| Production conditions | |
|---|---|
| Pressing temperature (for all examples): | 195° C. |
| Pressing force: | variable, in dependence on moulding density |
| Glueing: | Central layer and cover layers each glued separately; in Examples 1 and 3 the glueing and colouring of the cover layers were performed in separate operations |
| Statement of quantities: | in each case related to fibre weight absolutely dry; with the use of glueing and colouring mixtures, related to the mixture (not to the absolute resin or colour proportions) |

TABLE 3

| | Embodiments | | |
|---|---|---|---|
| | Example 1 | Example 2 | Example 3 |
| Cover layer fibre | 3-8 mm fibre length, 80% shorter than 1000 μm | 2-6 mm fibre length 90% shorter than 600 μm | 7-10 mm fibre length 70% shorter than 1500 μm |
| Cover layer glueing | Mixture, 6% | Mixture, 4%, mixed with colour mixture and jointly glued | Mixture, 11% |
| Colouring agents for cover layers | Mixture I, 4% | Mixture I., 4% | Cover layer bonding agent 4%, mixture II., 4%, powder III. 2% |
| Central layer fibre | 40-55% longer 2000 μm<br>15-20% 2000-1000 μm<br>15-20% 1000-500 μm<br>30-5% shorter 500 μm | 60-80% longer 2500 μm<br>10-15% 2500-1000 μm<br>5-10% 1000-500 μm<br>5% shorter 500 μm | 40-50% longer 3000 μm<br>35-40% 3000-2000 μm<br>5-15% 2000-1000 μm<br>5-15% shorter 1000 μm |
| Central layer glueing | Bonding agent A., 10% | Bonding agent B., 14% | Bonding agent B., 10% Bonding agent C., 10% (mixed before glueing) |
| Fibre proportion, cover layers | 15% | 20% | 10% |
| Bending strength (dry) N/cm$^2$ | 6000 | 7000 | 7500 |
| Water absorption (24 h) % | 25 | 20 | 15 |
| Expansion of thickness (24 h) % | 20 | 18 | 20 |
| Density g/cm$^3$ | 1.05 | 1.0 | 0.85 |

FIGS. 1 and 2 illustrate an advantageous embodiment of multilayer fibre mats according to the invention. FIG. 1 is a diagrammatic section through the structure of the mat, while FIG. 2 associates the particular composition of the individual layers with a diagrammatic section through the multilayer fibre mat structure.

Figure 3:
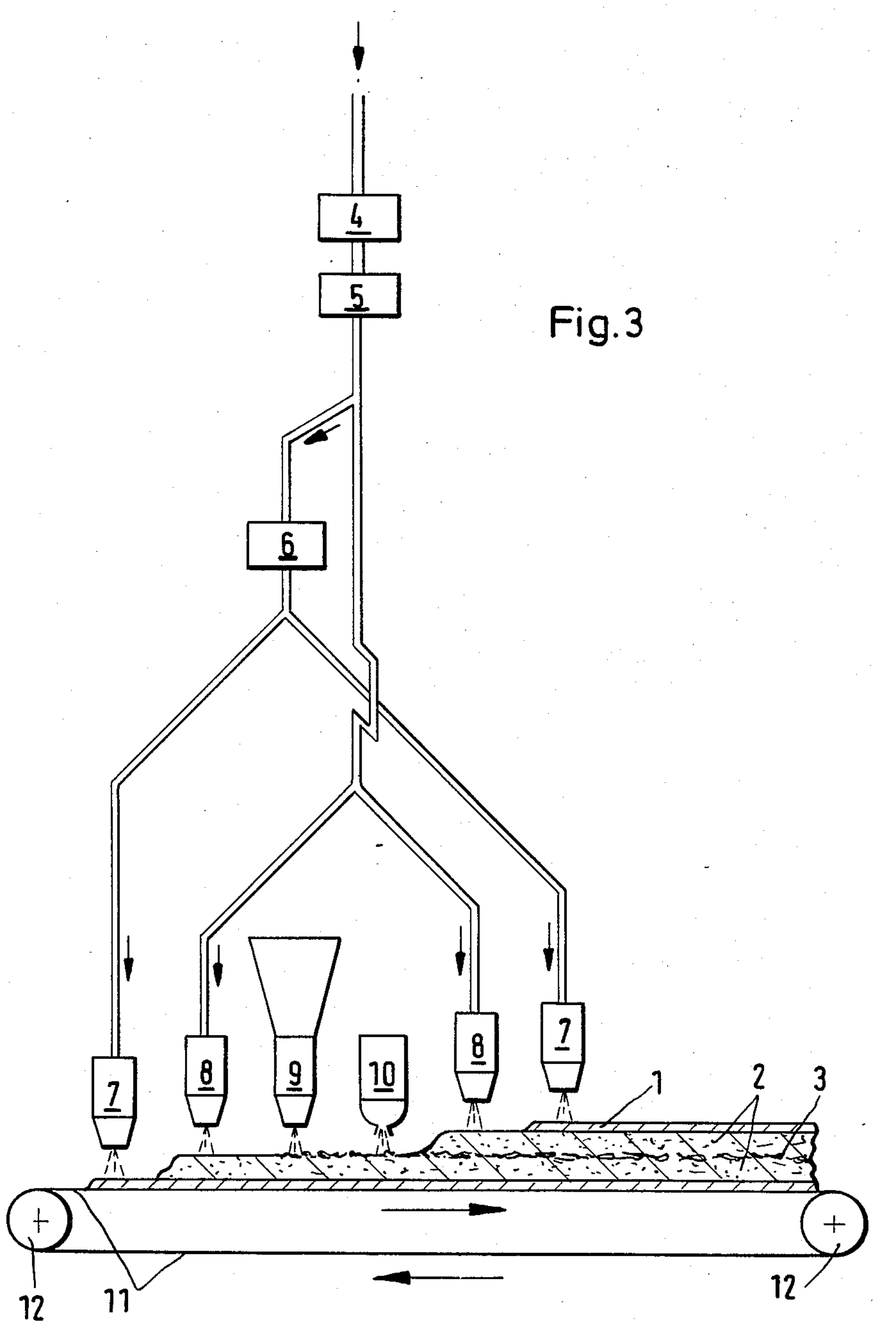
FIG. 3 illustrates in greater detail by means of a mass flow diagram the manufacturing system of the multilayer fibre mat illustrated in FIGS. 1 and 2.

FIG. 1 shows cover layers 1 and a central layer 2. Embedded in the central layer is a layer 3 of polypropylene fibres having a length of 0.5-4 cm. These synthetic fibres are also adhesively fixed by spraying on in the central layer 2 an additional latex glueing (not shown in FIG. 1).

The cover layers 1 and the central layer 2 consist of uniformly prepared wood fibres; they contain a common basic glueing of about 11% bitumen and 1.6% phenolic resin. Fed to the cover layers 1 during the production of the multilayer fibre mat are additional glueing components which consist of acrylic and melamine resin and also soot and wax.

The relative proportion of the cover layers 1 in the complete mat is about 30%.

A precise survey of the composition of the multilayer fibre mat according to the invention as shown in FIG. 1 is illustrated in FIG. 2, in which the components of the mat are listed in percentages and associated with the particular zones of the mat.

FIG. 3 illustrates the production of the mat diagrammatically, showing a glueing station 4 at which in the first place all the fibres are glued with the stated quantity of bitumen and phenolic resin. The wood fibres thus glued pass through a drier 5. Downstream of the drier 5 the fibre stream branches: the main quantity of pre-glued fibres is fed to strewing heads 8 directly or via an intermediate bunker (not shown). The strewing heads 8 form the central layer on a mat supporting belt 11 which moves in the direction indicated by the arrow and is guided by means of rollers 12. The subsidiary flow branched off from the main flow of fibres downstream of the drier 5 and required for the formation of the particular cover layers 1 passes through an additional glueing station 6 at which an additional glueing of acrylic and melamine resin and also soot and wax are added to the pre-glued fibres. Then the subsidiary flow for forming the cover layer is fed to the strewing heads 7 provided for this purpose.

Disposed between the strewing heads 8 for the central layer is an additional strewing head 9 by means of which the polypropylene fibres of corresponding length are introduced in one layer into the central layer 2. By means of a spraying device 10 the additional bonding agent (latex) used for fixing the polypropylene fibres is fed directly to the embedding zone of the polypropylene fibres 3. The continuous strand of mat, formed in the manner described by the strewing heads 7, 8, 9 and the spraying device 10 then passes (not shown in the drawing) in known manner through calenders in which it is pre-compacted into a mat strand which can be handled. To make the drawing easier to understand, FIG. 3 also omits ancillary devices by means of which the thickness of the individual mat layers is evened out and which take the form of prior art peeling rollers, spiked rollers or rotating brushes.

The single-layer introduction of the synthetic fibres 3 into the central zone of the central layer 2 and the fixing of such fibre layer with an additional latex bonding agent has the advantage of producing in the mat a net-like structural layer of good adhesion which acts during the subsequent deformation of the mat as a deformation aid, since the layer is capable of absorbing tensile forces and can inhibit impermissibly high local expansions of the mat during subsequent shaping.

If the softening temperature of the synthetic fibres 3 is lower than the subsequent working temperature of the mats during hot pressing, the additional advantage is obtained that when arranged in one layer the synthetic fibres stick to one another and therefore form a continuous reinforcing fabric. In addition, the adhesion between the synthetic fibres and the wood fibres is improved in that case.

I claim:

1. A multilayer fiber mat for the eventual production of mouldings in a die by later applying pressure to the fiber mat while obtaining moulding temperature in a temperature range of from about 170° to 210° C. to form the moulding, the mat comprising:

two cover layers formed of woody fibrous material and a proportion of thermosetting synthetic resin which can be pressed in the temperature range of 170° to 210° C., and a central layer sandwiched between the cover layers which is formed of woody fibrous material containing a thermoplastic bonding agent additive the resistance to oxidation of which is inadequate within said temperature range;

said two cover layers containing about 10 to 30% of the total fibrous material of the mat with the central layer containing the remainder thereof, and the relatively high proportion of thermosetting resin in said cover layers compared to said central layer preventing deterioration of the thermoplastic bonding agent in said central layer during moulding, so that moulded mats of high quality can be produced notwithstanding the inclusion of said oxidation-sensitive thermoplastic bonding agent additive in the central layer.

2. A multilayer fibre mat according to claim 1 wherein the central layer also contains synthetic fibres of thermoplastic material.

3. A multilayer fibre mat according to claim 1, wherein the central layer contains 2 to 15% polypropylene fibres; 3 to 15% bitumen; 0.5 to 3% latex, and 0.5 to 6% phenolic resin.

4. A multilayer fibre mat according to claim 2 or 3 wherein the cover layers are impregnated with acrylic and melamine resins, as well as with bitumen and phenolic resin.

5. A multilayer fibre mat according to claim 4, wherein the cover layers contain colouring and hydrophobizing agents and also odour-suppressing components.

6. A multilayer fibre mat according to claim 2, wherein said synthetic fibres are formed of a thermoplastic material whose softening point is lower than the working temperature of the mats during hot pressing; and such synthetic fibres are disposed substantially in a centre zone of the central layer of the multilayer fibre mat and are fixed in that zone by a latex bonding agent.

7. A multilayer fibre mat according to claim 3, wherein said central layer contains 2 to 5% polypropylene fibres; 5 to 10% bitumen; 1 to 3% latex; and 1 to 3% phenolic resin.

8. A multilayer fibre mat according to claim 1, wherein the central layer contains 2 to 15% polypropylene fibres; 3 to 15% bitumen; 0.5 to 3% latex; and 0.5 to 6% phenolic resin.

9. A multilayer fiber mat according to claim 1 wherein synthetic fibers formed of a thermoplastic material, the softening point of which is below the working temperature of the mats during hot pressing, are disposed in a center zone of said central layer of the multilayer fiber mat.

10. A multilayer fiber mat according to claim 9 containing an odor-suppressing agent and wherein said synthetic fibers are fixed in said center zone by a latex bonding agent.

11. A process for the production of the multilayer mat of claim 1 comprising the steps of pouring fibrous mat material in layers onto a conveyor belt and levelling and compacting the material prior to demoulding, the improvement comprising first furnishing fibrous material intended for all three layers together with a thermoplastic bonding agent additive; then, prior to applying the fibrous material to a conveyor belt, branching off a quantity of the fibrous material intended for the cover layers from the total fibre flow while providing the branched-off fibrous material with the thermosetting synthetic resin; and supplying the component fibre quantities for the individual layers to a conveyor belt in corresponding sequence.

12. A process for the production of a multilayer mat according to claim 6, further comprising adding leather fibres, cotton fibres, or a combination thereof to the cover layers.

13. A process for the production of the multilayer mat of claim 1, comprising the steps of pouring the mat material in layers onto a conveyor belt and levelling and compacting the material prior to demoulding, the improvement comprising supplying the fibrous materials of the cover layers and of the central layer separately with the thermosetting and thermoplastic bonding agent additive respectively, and then feeding the respective materials to the conveyor belt.

14. A process for the production of a multilayer mat according to claims 11 or 13, comprising impregnating the fibre mass for the cover layers with one of an acrylic resin and a modified acrylic resin, and adding 12 to 15% bitumen and 1 to 3% phenolic resin as a bonding agent, at least for the central layer.

15. A process for the production of a multilayer mat according to claim 14, further comprising adding leather fibres, cotton fibres, or a combination thereof to the cover layers.

16. A process for the production of a multilayer mat according to claim 1, in which the fibrous material is distributed into layers on a conveyor belt, leveled, and compacted, comprising:

furnishing the fibrous material to successive strewing means disposed at respective positions along the belt, this step including supplying the fibrous material through a channel to one or more central strewing means together with a thermoplastic bonding agent to form the central layer, branching off a quantity of the fibrous material containing thermoplastic bonding agent from said channel, providing the branched-off fibrous material containing thermoplastic bonding agent with thermosetting resin, and supplying the thermoplastic bonding agent-containing, branched-off fibrous material provided with thermosetting resin to the central layer as covering layers therefor.

17. A process for the production of a multilayer mat according to claim 1 in which the fibrous material is distributed by strewing means into layers on a conveyor belt, leveled, and compacted, comprising:

supplying fibrous materials for the cover layers together with thermosetting synthetic resin to outer strewing means, separately supplying the fibrous materials for the central layer together with thermoplastic bonding agent to one or more central strewing means disposed between said outer strewing means, and feeding said materials successively from said strewing means onto said conveyor belt to form, in sequence, a cover layer, the central layer, and the other cover layer.

* * * * *